(12) United States Patent
Anaya et al.

(10) Patent No.: US 10,977,446 B1
(45) Date of Patent: Apr. 13, 2021

(54) UNSUPERVISED LANGUAGE AGNOSTIC INTENT INDUCTION AND RELATED SYSTEMS AND METHODS

(71) Applicant: Lang Artificial Intelligence Inc., Madrid (ES)

(72) Inventors: Henry Anaya, Madrid (ES); Jorge Miguel Peñalva, III, Madrid (ES); Enrique Fueyo, III, Madrid (ES)

(73) Assignee: LANG ARTIFICIAL INTELLIGENCE INC., Madrid (ES)

( * ) Notice: Subject to any disclaimer, the term of this patent is extended or adjusted under 35 U.S.C. 154(b) by 146 days.

(21) Appl. No.: 16/284,519

(22) Filed: Feb. 25, 2019

Related U.S. Application Data

(60) Provisional application No. 62/634,290, filed on Feb. 23, 2018.

(51) Int. Cl.
*G06F 40/30* (2020.01)
*G06F 40/279* (2020.01)

(52) U.S. Cl.
CPC ............ *G06F 40/30* (2020.01); *G06F 40/279* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | | |
|---|---|---|---|---|
| 6,751,661 B1* | 6/2004 | Geddes | ................... | H04L 41/16 709/202 |
| 8,122,016 B1* | 2/2012 | Lamba | ..................... | G06F 16/00 707/723 |
| 8,315,849 B1* | 11/2012 | Gattani | ................. | G06F 40/295 704/2 |
| 8,954,440 B1* | 2/2015 | Gattani | ................... | G06F 16/93 707/738 |
| 9,224,116 B2* | 12/2015 | Schmidt | ........... | G06Q 10/06316 |
| 2005/0033600 A1* | 2/2005 | Geddes | .................. | G06Q 10/06 706/14 |
| 2005/0192870 A1* | 9/2005 | Geddes | .................. | G06Q 30/02 705/7.12 |
| 2007/0083509 A1* | 4/2007 | Wu | .......................... | G06F 16/35 |
| 2008/0263323 A1* | 10/2008 | Mould | .................. | G06F 9/3857 712/42 |
| 2011/0208715 A1* | 8/2011 | Ni | ........................ | G06F 16/9535 707/709 |
| 2012/0089959 A1* | 4/2012 | Park | ...................... | G06F 9/5055 717/105 |
| 2013/0006952 A1* | 1/2013 | Wong | .................. | G06F 16/9535 707/706 |
| 2014/0081626 A1* | 3/2014 | Chang | ..................... | G06F 40/30 704/9 |
| 2015/0032443 A1* | 1/2015 | Karov | ..................... | G06F 16/36 704/9 |
| 2015/0073798 A1* | 3/2015 | Karov | ................... | G06F 40/289 704/245 |

(Continued)

*Primary Examiner* — Lamont M Spooner
(74) *Attorney, Agent, or Firm* — Malloy & Malloy, P.L.

(57) ABSTRACT

A method for unsupervised language understanding may be carried out in a software environment and is operative to identify pairs of semantically-related words within a corpus of documents, extract candidate intents from the pairs of semantically-related words, and define the most general intents from the candidate intents, without human guidance or supervision.

14 Claims, 5 Drawing Sheets

(56) References Cited

U.S. PATENT DOCUMENTS

| | | | |
|---|---|---|---|
| 2015/0121216 A1* | 4/2015 | Brown | G06N 3/008 |
| | | | 715/707 |
| 2016/0110428 A1* | 4/2016 | Vasenkov | G06F 16/367 |
| | | | 707/776 |
| 2017/0097966 A1* | 4/2017 | Kozareva | G06Q 30/02 |
| 2017/0097986 A1* | 4/2017 | Zhu | G06F 16/3326 |
| 2017/0212892 A1* | 7/2017 | McIntosh | G06F 16/783 |
| 2017/0293625 A1* | 10/2017 | Nachlieli | G06Q 30/01 |
| 2017/0329820 A1* | 11/2017 | Park | G06F 16/24522 |
| 2018/0130007 A1* | 5/2018 | Fowler | G06F 16/9024 |

\* cited by examiner

US 10,977,446 B1

UNSUPERVISED LANGUAGE AGNOSTIC INTENT INDUCTION AND RELATED SYSTEMS AND METHODS

CLAIM OF PRIORITY

The present Non-Provisional patent application claims priority pursuant to 35 U.S.C. Section 119(e) to a currently and prior filed Provisional patent application, namely, that having Ser. No. 62/634,290 filed on Feb. 23, 2018, the contents of which is incorporated herein by reference in its entirety.

FIELD OF THE INVENTION

The invention is directed to systems and methods for unsupervised language understanding.

RELATED ART

Current language understanding models are useful for a variety of purposes such as customer feedback analytics, construction of "chat bots" (software capable of autonomous text responses), and other tasks which require extraction of information in order to infer facts or data. One component that is important to most language understanding models is referred to as intent extraction which can be loosely defined as methodologies for parsing the intentions behind statements, such as understanding the actions and objects in a sentence, what the relationships between those actions and objects is or should be, and therefore what kind of information can be inferred from the statement.

Current techniques of language understanding are cumbersome, require intense manual oversight, are time consuming, and do not lend themselves to real time feedback. A traditional "supervised" methodology requires manual labeling of data according to desired annotators or classes, and then training the supervised algorithm to "learn" the annotators or classes. This method has been deficient due, not only to the time consumption, but also to the fact that human supervision may bias the supervised algorithm according to the human supervisor(s). Additionally, in the scenario where the corpus of text is dynamic, it is not possible to extract new information without repeating the annotating and learning cycle.

Enhancements in the field have lead what are known as clustering or embedded mapping approaches, which are, to a certain extent, semi-unsupervised, but still are cumbersome to employ. One known method, Latent Dirichlet Allocation, requires supervised definition of classes or topics prior to running the model, which is not useful to discover new intents or topics within a corpus of which the supervisor is not aware. Additionally, classes tend to be defined or represented by the most common words within the class, which may not be the best representation of the intention of the class. Finally, incremental approaches, while possible without repeating the learning cycle, are difficult.

Accordingly, there is a need in the art for a methodology that is able to extract "intents" from various groups of texts, over a wide range of data points, with no need to predefine classes, no need to pre-label data, and no need to post-label data. Such an "unsupervised" intent extraction lends itself to analyzing the corpus at the speed of a computer processor, rather than a human supervisor, and doing so according to a predetermined algorithm, rather than the whims of a human supervisor, will eliminate bias in the extracted intents.

Moreover, such an unsupervised intent extraction lends itself to utilization with a dynamic corpus, such that more data can be collected as the corpus expands, leading to new intents to be extract and/or further specification of the intents. Finally, such a proposed unsupervised intent extraction is language agnostic.

SUMMARY OF THE INVENTION

The invention is directed to methods and systems for extracting intents and entities from any kind of text in an unsupervised way. In one embodiment, an intent may comprise a single keyword that represents an important but concrete concept within the corpus, i.e., it must be broad enough to encompass a category of related terms, but be neither abstract nor superfluous. For purposes of the present disclosure, such an intent will be referred to as a singleton keyword, because singleton keywords are capable of representing an entire category of topics with only a single term. One example of a singleton keyword, in the context of a hotel-based corpus (e.g., social media postings or reviews about a particular hotel brand) could be the term "checkout."

In yet further embodiments, an intent may comprise a group of two of more words that have semantic meaning together or that represent a group of texts that share the same semantic meaning, e.g., the reason why an author has written a certain text or the core of that text. Some examples of intents are those that are topic-related (e.g., bag-check), action related (e.g., Pay-bill, fix-please), sentiment related (e.g., great-service), emotion related (e.g., Hate-airline), characteristic-related (e.g., Gluten-free, battery-life), brand related (e.g., Trader Joe's-quality), and product related (e.g., iPhone-x), but others may be utilized. As will be discussed further below, singleton keywords and semantic groups may be used interchangeably in various methods to achieve certain ends. Singleton keywords and semantic groups also have distinct benefits when compared to each other and may be used to complement each other in certain embodiments, as will be disclosed.

In any event, once an intent, and therefore the semantic relationship between a group of words, is understood by a system utilizing the present invention (e.g., a computer system running software configured to carry out the present invention), such a system can identify similar contexts automatically even if the group of words or singleton keyword comprising the intent is not included in that similar context. By way of example, an inquiry made as to whether a passenger may "take" a "briefcase" onboard may be related to a "bag-check" intent. By way of further example, an inquiry made as to whether a hotel guest must "leave" before "noon" may be related to a "checkout" intent.

The inventive method uses as input an initial, raw database of virtually any kind of text including but not limited to, documents such as contracts, legal documents, public documents or any other kind of document translated to text; social media data such as tweets, Facebook comments, Reddit posts or any kind of data extracted from social media; internet data such as blog posts, newsfeeds or any kind of online data; survey data or any kind of customer feedback data gathered deep web data and dark web data; emails or any other kind of communication in a written form; calls translated to text or any kind of oral communication translated to text. The raw database of text is referred to as a corpus.

One embodiment of the present invention is able to extract intents from the corpus without any human guidance or supervision, i.e. there is no need to define parameters such as classes, contexts, features, or topics. In further embodiments, the intents are assigned a name (or "defined") that is both interpretable by a human user and represents to the human user the intent of the semantic group. The name can be either a singleton keyword or a semantic group (two or more words) that represents the intent. The content of each intent is formed by semantically related units of text.

In certain embodiments, intents that are comprised of semantic groups are first identified using an information gain criterion. This may be accomplished utilizing Kullback-Leibler divergence. By way of example, when the expected value of the Kullback-Leibler divergence satisfies a predetermined condition, there is sufficient information gain pertaining to a given semantic group to be identified as such. In yet another embodiment, semantic groups are determined by reference to a set of predetermined criteria designed to ensure that the semantic relationship is of a probabilistically determined value, i.e., the probability of the semantic group co-occurring in the same corpus is above a predetermined threshold, and the semantic group does not include general or corpus-specific stop words, and that the semantic group is not overly specific according to a predetermined criteria.

In other embodiments, intents Which are singleton keywords may be preliminarily identified with respect to a predetermined self-contained information scoring which, in preferred embodiments, comprises the logarithmic ratio of a measure of entropy of a given singleton keyword to a calculated information gain score of the given singleton keyword. More specifically, in a preferred embodiment, a generalized information gain score may be as follows:

$$S_\alpha(w) = \log\left(\frac{H_\alpha(w)}{IG_\alpha(w, w)}\right), \text{ where}$$

$$IG_\alpha(w_1, w_2) = p(\{w_1, w_2\}) * \left(\log\left(\frac{p((w_1, w_2))}{p(w_1) * p(w_2)}\right)\right)^\alpha, \text{ and}$$

$$H_\alpha(w) = -p(w) * (\log(p(w)))^\alpha.$$

According to this measure, intents which have a score $S_\alpha(w)$ approaching zero appear relatively frequently in the corpus, but are not sufficiently related to other terms in the corpus. On the other hand, intents with large scores are either stop words or are too specific to usefully function as an intent, as envisioned by the present invention. Accordingly, in preferred embodiments, it is desirable to predefine upper and lower boundaries of the self-contained information score with which to identify optimal singleton intents. By way of example, the upper and lower boundaries may be defined as follows:

$$\text{upper} = \text{argmax}_w\{IG_\alpha(w,w) * S_\alpha(w)^2\}$$

$$\text{lower} = \text{argmax}_w\{IG_\alpha(w,w)^2 * S_\alpha(w)\}$$

Candidate intents can then be defined by extracting singleton keywords which satisfy the following two conditions:

$$\exp\left\{\frac{1}{Z}\sum_{w \in dom} IG_\alpha(w, w) * \log(IG_\alpha(w, w))\right\}$$

1. $S_\alpha(\text{lower}) \leq S_\alpha(w) \leq S_\alpha(\text{upper})$, where $w$ is within the domain $S_\alpha$; and;

2. $IG_\alpha(w, w) \geq \zeta_0$, where $\zeta_0 = z(w) = \sum_{w \in dom} IG_\alpha(w, w)$ and $dom = \{w : IG_\alpha(w, w) > 0\}$.

In certain embodiments, the inventors have determined that a value of $\alpha=2$ yields desirable results in the context of the present invention.

Once a set of candidate intents have been derived, it may also be desirable to further filter the set of candidate intents to arrive at final intents (also referred to simply as "intents"). A concept that is relevant to further filtering of candidate intents is that of a feature. In the context of the present invention, a feature may be a word or group of words which are related to an intent and provide additional specificity for at least one context of an intent. Features will be discussed further herein. However, with respect to further filtering of the set of candidate intents, features may be computed for each word in the set of $\Theta(w)$ candidate intents, and the set of features, may be defined as follows:

$$\Theta(w) = \{w' : 0.01 * IG'_3(w,w) \leq IG'_3(w,w') \leq \log(2) * IG'_3(w,w')\}$$

where, $$IG'_3(u, v) = \frac{|supp(u) \cap supp(v)|}{N} \log\left(\frac{|supp(u) \cap supp(v)| * N}{|supp(u)| * |supp(v)|}\right)$$

N is the number of documents in the corpus, and $|supp(x)|$ denotes the number of documents containing the word x. With this in mind, a word within the set of candidate intents is considered to be a keyword $\Theta(w)$ singleton-type intent if is nonzero and the word appears in at least one quarter of the documents in the corpus of documents that include the candidate intent. Stated otherwise, $\Theta(w) > |supp(w)|$.

With respect to embodiments in which intents are comprised of semantic groups, a similar procedure for identifying candidate intents may be utilized, i.e., an initial culling of intents which are probabilistically determined to be suitable for intent extraction such that later steps of the methodology are not overly encumbered with the amount of word groups to be analyzed. In one embodiment, candidate intents are extracted from each document in the corpus. In yet another preferred embodiment, the candidate intents satisfy both of the following conditions: (i) each term in the candidate intent occurs in the same document of the corpus; and (ii) all terms of the candidate intent are pairwise (or other if more than two terms are used) included in the semantically-related terms identified in the initial step.

The candidate intents are then mapped to an explicit word embedding to facilitate extraction of the most "general" intents. In a particular embodiment, the candidate intents are mapped to a directed acyclic graph ("DAG") for the purpose of organizing the candidate intents according to their generalization. In such an embodiment, measures of divergence and entropy are utilized to indicate whether the candidate intent is statistically significant, and therefor semantically significant within a hierarchy, or is statistically insignificant. The most general candidate intents, according to predetermined thresholds, are considered to be intents for the purpose of the present invention.

In further embodiments, each of the intents may be further specified by features and/or entities that are associated with the intent in an unsupervised manner. A feature may comprise a characteristic of the intent that has an important semantic charge and allows for subdivision of the group of the intent into more specific groups that share the same semantic meaning. By way of example, a feature can be a noun (e.g., intent=fix-please, feature=computer), an adjective (e.g., intent=fix-please, feature=invalid), a verb (e.g., Intent=fix-please, feature=restart), an entity (e.g., Intent=fix please, feature=iPhone) or any kind of word that adds semantic information into a certain context. Features and entities may be extracted, in certain embodiments, by reference to their arrangement on a DAG, Which will be lower (more specific) than the most general intents.

After extracting the intents, real-time classifiers are created to analyze each of the intents, and to facilitate intent induction on documents added to the corpus without having to retrain the entire model. A classifier can range from a Bayesian classifier (i.e., a probabilistic analysis of whether a new text belongs to a pre-defined intent) to a rules classifier (i.e., a logic-based set of restrictions for classifying new text in pre-defined intents) where each rule is formed by a set of words in a certain order and with specific distances. Those classifiers facilitate analysis of new text in real-time, categorizing new text as it is introduced into the corpus in one of the initially discovered intents and features.

A description of an algorithm according to one embodiment of the present invention is as follows. As discussed, the input to the algorithm is a collection of raw text documents, a corpus, modeled as D={d1, . . . , dN}.

One desired output of the algorithm, according to one embodiment of the invention, is as follows:
1) A set of intents, C, each intent including both:
  (i) a label (namely, a set of word lemmas) describing the semantic meaning of the intent, and
  (ii) a set of text (document) samples from the corpus D.
2) A document multi-classifier that classifies an input text into a subset of categories from C.

The methodology of the algorithm, as previously discussed, includes an initial step of identifying pairs of semantically related terms in the input corpus using an Information Gain criterion. These pairs of terms are then utilized to extract candidate intents from each document in the corpus. In one embodiment, this is accomplished by generating a set of word edges E={{xi, yi}} (i.e., a set of lexically related words such that each edge {xi, yi} represents a pair of words in D that satisfy the following conditions:

Condition 1A:

$$p(\{x, y\}) * \log\left(\frac{p(x \mid y)}{p(x)}\right) > \alpha * \min\left(p(\{x, y\}) * \log\left(\frac{p(x \mid x)}{p(x)}\right), p(\{y, y\}) * \log\left(\frac{p(y \mid y)}{p(y)}\right)\right)$$

where each component of the above inequality is defined as follows:

(a) where: $p(\{x, y\}) \propto$ $$\sum_{d \in D} \sum_{w_1 \in V} \sum_{w_2 \in V} p(w_1 \mid d) * p(w_2 \mid d) * p(d) * I(w_1 \in \{x, y\} \wedge w_2 \in \{x, y\})$$

(i) V is the vocabulary of C,
  (ii) p(d) is the probability of d in C (in which it is possible to consider each document to be equally probable in C),
  (iii) for all w, p(w|d) represents the Maximum Likelihood Estimation of MLE observing w in d, and
  (iv) I is the identity function.
(b) $p(x) \propto \sum_{w \in V} p(\{x, w\})$
(c) $p(x) \propto p(\{x,y\})/(p(y|x))$ Condition 2A: Neither x nor y are general stop words.
Condition 3A: Neither x nor y are corpus-based stop words, i.e. both log(P(x|x)/P(x)) and log(p(y|y)/P(y)) are greater than a threshold, $\theta_0$.
Condition 4A: Both x and y are not specific or rare words, i.e., both log(P(x|x)/P(x)) and log(P(y|y)/P(y)) are less than a predetermined threshold $\theta_M$, which may be defined as the weighted geometric mean of all positive values $$\log\left(\frac{P(w \mid w)}{P(w)}\right).$$

The candidate intents are then mapped to an explicit word embedding that is employed to organize the candidates in a generalization DAG. This process is undertaken with reference to measures of divergence and entropy, where candidates that are statistical artifacts or generated by chance are disregarded.

Specifically, computation of a set of document signatures S from the set of edges E; where each signature $S_i \in S$ is a set of words comprising a group obtained by projecting the edges from E onto the set of all semantically-related pairs from the vocabulary of a document $d \in D$.

Then, as discussed, the set of document signatures (candidate intents) are organized in a generalization DAG. If all of the following conditions hold, then there is an arc $S_1 \rightarrow S_2$ representing a hierarchy of generalization for the candidate intents (namely, $S_2$ is a generalization of $S_1$) in the DAG.

Condition 1B: $KLD(LM(S_1), LM(S_2)) < KLD(LM(S_2), LM(S_1))$

Condition 2B: $KLD(LM(S_1), LM(S_2)) < \frac{1}{|S_2|} \sum_{w \in S_2} \log\left(\frac{p(w \mid S_1)}{p(w)}\right)$ Condition 3B: $\frac{1}{|S_2|} \sum_{w \in S_2} \log p(w \mid S_1) * \log\left(\frac{p(w \mid S_1)}{p(w)}\right) >$ $\theta_1$ (in a preferred embodiment $\theta_1$, has a threshold of approximately 0.02).

Condition 4B: For all $S_1 \in S$ satisfying conditions 1 through 3, with respect to $S_2$, then it must also $H(LM(S_i)) < H(LM(S_2))$ hold that
where:
LM(S) is the probability distribution {p(w|S)}

$$p(w \mid S) = \alpha * p(w) * \prod_{s \in S} p_1(s \mid w)$$

$$p_1(s \mid w) = \alpha_1 * p(s \mid w) + (1 - \alpha_1) * p(s)$$

($\alpha_1$ comprising a mixture coefficient, wherein in a preferred embodiment, 0.995 has been found desirable for smoothing purposes)
KLD is the Kullback-Leibler divergence calculated as $$KLD(P, Q) = \sum_{w} P(w) * \log\left(\frac{P(w)}{Q(w)}\right)$$

H is the entropy of language model:

$$H(P) = -\sum_{w \in V} P(w) * \log(P(w))$$

In a preferred embodiment, all document signatures (candidate intents) are included as nodes in the DAG, with the exception of such signatures that may violate condition 4B. Such signatures are considered to represent ambiguous categories.

Finally, the most general candidates in the DAG are considered to be intents. To define the set of intents C to be in a one-to-one correspondence with the set of signatures with no generalization according to the DAG (i.e., an intent is determined by a signature $S_i$ for which there is no signature $S_j$ such that $S_i \rightarrow S_j$). Stated otherwise, an intent is reached when a candidate intent has no further level of generality. An intent sample may comprise all of the documents that belong to the intent's signature as well as all other signatures generalized into the intent's signature.

The outcome of the intent induction process is a number of categories (i.e., the intents themselves) with a support (i.e., the documents where the terms comprising the intent appear). The support can be leveraged to iteratively refine the language models used to induce intents in order to improve information gain and also to create classes or classifiers, which may be used to classify new documents according to the predetermined intents. In one embodiment, in order to arrive at appropriate classifiers, positive and negative class probabilities are first defined as:

$$P(P) = \frac{|\text{class support}|}{|\text{corpus}|}$$

$$P(N) = 1 - p(P),$$

and a marginal probability can be determined by $p(c)=P(P)p(c|P)+P(N)p(c|N)$, where $p(c|P)$ is the language model of the positive class (i.e., the intent of interest), and $p(c|N)$ is the language model of the negative class, with respect to all documents not in the class support.

Accordingly, in at least one embodiment, the language model of the positive class may be iteratively updated according to:

$$p(c|P) = p(c|P)P(P)\log\frac{p(c|P)}{p(c)} + p(c|N)P(N)\log\frac{p(c|N)}{p(c)} + \frac{1-p(c|P)}{|c \text{ in } P|-1}P(P)\log\frac{1-p(c|P)}{1-p(c)} + \frac{1-p(c|N)}{|c \text{ in } N|-1}P(N)\log\frac{1-p(c|N)}{1-p(c)}$$

In other embodiments, only the first or first and third terms of the foregoing equation need be employed. Additionally, at each iteration, the marginal probability can be updated according to:
$p(c)=P(P)p(c|P)+P(N)p(c|N)$. Although, it may be appreciated that during each iteration, the information gain returned will yield diminishing results. The inventors have determined that changes in information gain less than 0.01 are a suitable stopping point for iteration.

Another function of classifiers is to determine the relatedness of a document to a particular category, or stated otherwise, classifiers may be used to define a score of the likelihood of a document being generated by a class. This likelihood may be determined by:

$$\ell_{d,C_i} = p(d|C_i) = \prod_{c \text{ in } C_i} p_s(c|d)^{p(c|C_i)}$$

where c is a document feature, $C_i$ is the class i, d is the document, and $p_s$ is a smoothed distribution over document features:

$$p_s(c|d) = \begin{cases} 0.99 p(c|d) + 0.0001, & \text{if } c \text{ in } C_i \\ 0.0001, & \text{otherwise} \end{cases}.$$

then a given document can be considered to "belong" to class C. Furthermore a relatedness score may be assigned as $$s_r = 0.4 + \frac{1}{1 + \exp(\prod_c p(c|Ci)^{p(c|Ci)} - \ell_{d,C_1})}$$

As will be discussed further below, certain embodiments of the present invention may employ smoothing operations to refine the classifiers. This may have the added benefit of determining new support (documents) for classes during the smoothing operation. Accordingly it may be desirable to approximate the prior of the positive class and the context distribution of the negative class as follows:

$$p(P) \approx \frac{\Pi p(c)^{p(c|C)}}{\Pi p(c|C)^{p(c|C)}}$$

$$p(c|N) \approx \frac{p(c) - P(P)p(c|P)}{P(N)}$$

Additionally the present invention may utilize a multi-classifier. Given a text document d, the multi-classifier assigns a set $C_d$ which is a subset of C (all possible intents).

$$C = \{S_1, S_2, \ldots S_N\}$$

$$C_d \subseteq C$$

According to the following classifier function F:

$$F: d \rightarrow *C_d \subseteq C$$

$$F(d) = \{S_i \mid p(S_i|d) > \theta_i\}$$

$$p(S_i|d) = \prod_{w \subseteq d} p(w|d)^{weight(w|S_i)}$$

where $p(w|d)$ is the normalized frequency of a word w in document d, and $$weight(w|s_i) = \frac{1}{Z} P_{sample_i}(w) * \log\left(\frac{P_{sample_i}(w)}{p(w)}\right)$$

if $w \in Sel(S_i)$, 0 otherwise $$Sel(S_i) = \left\{w \in V \mid \left(\log\frac{P_{sample_i}(w|w)}{P_{sample_i}(w)}\right) < \min\_self + \delta\right\}$$

with w being neither a corpus-based stop word from C nor a specific word in Sample_i, and Z being an $L_1$ normalization factor. The multi-classifier can facilitate classification or assignment of new words added to the corpus to pre-defined intents on a probabilistic basis.

Another aspect of the invention is the implementation of smoothing to refine the classifier model. In particular, utilizing the inventive smoothing methodologies described herein, class definitions may be extended in order to discern relationships between classes, allowing merging of classes in appropriate circumstances. Additionally, documents which are related to a given intent, but not otherwise classified, may be discovered.

Accordingly, it is important to understand that classifiers can be represented by a context distribution, such as two words that appear less than a predetermined distance from each other. In this regard, the context distribution can be applied to all documents in a corpus in order to determine the likelihood of each document being classified within a particular classifier. In a preferred embodiment, a document (d) may be classified in class (C) if $p(d|C) = \Pi_{c \in C} p(c|d)^{p(c|C)} > \gamma$, where $\gamma$ is computed for each class C.

With the foregoing in mind, the probability of a particular word appearing in a given class (p(w|c)) can be written in matrix notation, one that contains the class distribution $P_{ij} = P(word_i | class_j)$, as $P[N_w, N_c]$, where $N_w$ is the number of words and $N_c$ is the number of classes. Given this, a smoothing matrix for word relations within a document may be calculated as follows:

$$S(i, j) = p(w_i | w_j) \log\left(\frac{p(w_i | w_j)}{p(w_i)}\right),$$

so that (in matrix notation) P'=SP, where P' is a smoothed version of P.

While suitable for certain embodiments, this simple smoothing approach can be improved by employing certain criteria. By way of example, zero distance context distributions (words separated by less than one word) can be removed because they tend to create overly generalized language models. Additionally, elements of the matrices having a value of $$\log\frac{P(x, y)}{P(x)P(y)} < 2$$

may be removed as this value is indicative of a pair of words with too little information value to contribute to the model. Additionally, matrix elements can be re-weighted according to $$P'(x | y) = P(x | y) \log\frac{P(x | y)}{P(x)}.$$

Words having $$\log\frac{p(w_i | w_j)}{p(w_i)} < 1$$

are indicative of stop words, and thus can be filtered out, along with one-character words. Finally, each element of the matrix S can be re-weighted according to the conditional probability of the word. According to this embodiment of the invention, the smoothed version of the language model as capable of relating classes to words according to:

$$p^a(c | C) = \sum_w p(c | w) \sum_{w'} p(w | w') \sum_c p(w' | c) p(c | C),$$

which can be expressed in matrix notation as $A^s = QSPA$, where $A_{ij} = P(c_i | Cat_j)$, $Q_{ij} = P(c_i | w_j)$, and S and P are as disclosed above.

The results of the foregoing smoothing process can be further refined, regularized, filtered, and re-weighted for better results. In one instance, the context derived from very large classes (having large support) can also appear with high weight in smaller classes, which leads to small classes being fully conditioned by the contexts derived from the larger classes. By way of example, in working with a corpus of documents with text referring to banks, assume that 40% of the documents include the name of a particular bank and 1% of the documents include a negative comment about banks in general, leading to two classes that may be defined by [Name of]_Bank and banks_[negative term]. Because these two classes are "related" through the document corpus, and the name of the particular bank is extremely common in the corpus, the context distribution of "[Name of]" and "bank" appearing within 1 term of each other would appear with a high weight in the banks_[negative term] language model. Yet this may be undesirable because banks_[negative term] is a small class. Accordingly, it may be desirable to remove general class models coming from the larger classes by requiring at least one of the words in a class to have a sufficient pointwise mutual information value as follows:

$$\max\_pmi_c = \max\left(\log\frac{p(w_0 | c)}{p(w_0)}, \log\frac{p(w_1 | c)}{p(w_0)}\right) > 1.1 * ref\_pmi$$

where ref_pmi is the $\max\_pmi_c$ of the class with the largest probability in the non-smoothed classifier.

A re-weighting procedure may be desirable to avoid inaccurate relationships discovered by the smoothing process. For example, in a banking related corpus, classes may include checking_account and take_into_account. Superficially, these two classes may be related through the term "account," yet checking_account clearly refers to a type of bank account, while take_into_account clearly refers to a semantically unrelated expression. Accordingly, it may be desirable to weight those classes with context distributions that are similar to those of the original class. In one embodiment, the re-weighting procedure may be as follows: $p'(c_s|C) = p(c_r|C) p(c_s|C) sim(c_r, c_s)$ where $$sim(c_r, c_s) = \exp\left\{\frac{-g_d(c_r, c_s)^2}{2R^2}\right\}$$

is a score of the similarity between classes related through the geodesic distance $$g_d(c_r, c_s) = \sum_{i \in C_r \cap C_s} \sqrt{p(c_r^i | C_r) p(c_s^i | C_s)}.$$

$C_s$ is the context of a smoothed classifier, while $C_r$ is the context of the regular or non-smoothed classifier.

As may be understood, a smoothed language model can result in determination of more contexts having small weights, Which can add an element of unwanted noise to a classifier. The inventors have determined that utilizing the geometric mean of the distribution values as a cutoff criterion yields good results to mitigate this effect.

Once classes are sufficiently smoothed, it may then be possible to determine interclass relationships. According to the criterion;

$$ig(C_i, C_j) > \beta \min(ig(C_i, C_i), ig(C_j, C_j)),$$
$$\text{where } ig(C_i, C_j) = p(C_i, C_j) \log \frac{p(C_i, C_j)}{p(C_i)p(C_j)}$$

and for values of $\beta<1$, then beta may be considered a free parameter. The outcome of this criterion is considered an inter-class relationship score. The inventors have determined that values of $\beta=0.85$ reliably yields a determination that two classes may be considered the same for the relevant considerations of the present invention.

Another benefit of the classifier smoothing disclosed herein is the ability to determine documents that may be related to predetermined intents, but Which were not initially classified until smoothed classifiers were determined. In accordance with one embodiment of the present invention, the inventors have determined that a relatedness criterion yields good results as follows:

$$s_r = 0.4 + \frac{1}{1 + \exp(\prod_c p(c|Ci)^{p(c|Ci)} - \ell_{d, C_1})}$$

Yet another aspect of the present invention involves the determination of a scoring criterion sr which yields desirable results. However, as may be understood, each class can include a different number of features within its models, which results in dissimilar distributions between classes. According, a per-class threshold score may be desired. In one embodiment, the per-class threshold score may be calculated as follows:

$$\prod_{C \in C_1} p(c|C_i)^{p(c|C_1)} + \frac{\prod_{C \in C_1 \cap d} p(c|d)^{p(c|C_1)}}{\prod_{C \in C_1 \cap d} p(c|C_1)^{p(c|C_1)}}$$

where the numerator is the standard score terra, the denominator is a normalization term, and the additive term may be employed to account for bias inherent in sharp intent distributions resulting from intents defined by a smaller number of features, which are more likely to have related documents with smaller scores.

The scoring criterion may be implemented by way of the following exemplary pseudo-code, when analyzing a new document that has yet to be classified:
FOR cat IN categories:

```
    lik = likelihood(doc,cat_weights)
    IF lik > threshold
```

-continued

```
        scr1 = regular_score(doc,cat_weights)
        score[cat] = scr1
    ELSE
        scr2 = smooth_score(doc,cat_weights)
        IF scr2 >= threshold_1
            score[cat] = gamma_1 * scr2
        ELSE
            Scr3 = smooth_score(doc,smooth_cat_weights)
            IF scr3 >= threshold_2
                score[cat] = gamma_2 * scr3
```

The smooth_score operator in the foregoing pseudo-code may comprise the per-class threshold score discussed above. Once scores are set, thresholds for scr2 and scr3 may be selected in the above-referenced pseudo-code.

A final aspect of the foregoing discussion of classifier smoothing is the selection of gamma γ values. With continuing reference to the foregoing pseudo-code, if a document does not surpass the scr1 threshold, the algorithm will attempt again to pass the document with scr2 and scr3. Gamma values ensure the score that a particular document receives is not higher than the score it would have received if it had passed any of the first two threshold scores, ser1 or scr2. As such, gamma may be selected as follows:

$$\gamma = \frac{\min(\mu_p) - \max(\sigma_p)}{\min(\mu_c) + \max(\sigma_c)},$$

Where $\mu_p$ is the mean of the score values for the previous scores computed for each class, $\sigma_p$ is the standard deviation, while $\mu_c$ is the mean of the score values for the currently scored class, and $\sigma_c$ is the standard deviation for the currently scored class.

In yet further embodiments of the present invention, a lemmatizer may be employed in order to remove inflectional endings from words and return words to their root forms. Furthermore, a tokenizer may be utilized to demarcate strings of input text. As such, it will be appreciated that the present invention is capable of unsupervised language understanding of virtually any language as it does not rely on particular ontologies or syntax and is capable of parsing many variations on words to arrive at the same semantic meaning, even if different variations of the word are used.

In additional embodiments, a regularization term may be applied in order to account for typos in the corpus, which lead to a low weighting for contexts that should otherwise be important. This is because typos tend to be infrequent compared to the correctly spelled or written word (save for systematic errors). To mitigate this effect, a regularization term can be applied to documents shared by contexts and between contexts of the same class, as follows:

$$Z_C = [p(c_0|C)p(c_1|C) \ldots p(c_n|C)]^T$$
$$Z'_C = \alpha Z_C + (1-\alpha)RZ_C,$$

where $R_{ij}=1$ if $c_i$ and $c_j$ appear together in at least one document of the corpus.

In certain circumstances, however, the regularization term may result in overly weighted contexts. Important contexts within a class $p(c|C)$ should be discernible within the global context distribution $p(c)$. A filter may be desired to keep only those contexts whose $$\log \frac{p(c \mid C)}{p(c)} > \gamma.$$

In other circumstances, the foregoing may result in contexts from large classes that are capable of classifying many documents into the class, despite the fact that the context itself has low weight, i.e., its classification power is not proportional to its weight. Accordingly a filter may be applied to remove such contexts as follows: where n/N is the ratio of documents $$\frac{n/N}{\sum_{c \text{ in rule}} p(c \mid C)} > \gamma_{rules}$$

brought into the class by a context, to the total number of documents in the class. The denominator term is the sum of weights in the rule. The inventors have determined that a value of $\gamma_{rules}$ equal to approximately 9 yields good results.

In another embodiment of the present invention, the inventive methodology is carried out as a software program on a computer. A client device is utilized to control the software program, which is given access to a database including the corpus. The software program is configured to execute the foregoing methodology on a memory of the computer.

The present invention may be implementable on an application server in a software-as-a-service (SaaS) environment. As such, a system of the present invention may comprise at least one device communicably connected to an application server over a network. One or more third party server(s) may further be communicably connected to the application server and the at least one device over the same network.

The device may comprise a mobile device, a tablet, a computer, a wearable electronic device, or any other device or combination of circuits structured and configured to communicate with another device, computer, or server over the network. The device may comprise application(s) and user interface(s) (front-end interface) that allows a user to interact with the application server, for example to upload or analyze the corpus, and any third party server(s) and stored applications and programs thereon (e.g., back-end processing or importing a corpus from third-party sources). The user interface may be proprietary and may comprise a custom developed mobile or desktop application which allows a user to interact with the system of the present invention. Alternatively, or in addition to, the user interface may comprise a web browser, mobile browser, or other application or executable code that allows for communication and visualization of information.

The term "application server", "third party server" refer to at least one computer having appropriate hardware and applications installed thereon for the provision of server services including web and other functional services described herein, such as software configured to execute the inventive methodology, such that a user may access, execute, and/or the applications remotely from a device. More specifically, the application server and third party server(s) may comprise general purpose computers, specialized computers, or other hardware components structured and configured to receive, process, transmit, and store information to and from other devices. The application server is further configured with executable or interpretable computer code that allows it to perform the processes described within this application, namely, the unsupervised extraction of intents from a corpus.

For example, the application server may comprise a general purpose computer comprising a central processing unit (CPU), which may be a single core or multi core processor, memory (random-access memory, read-only memory, and/or flash memory) or primary memory for high-speed storage of executing programs, electronic storage unit (e.g., hard disk) or secondary memory for storing data, communications interface (e.g., network adapter) for communicating with other devices or computers over a network, and/or peripheral device(s) in communication with the CPU that enable input/output of the application server.

The application server may implement the methodology of the present invention using any number of solution stacks (a set of software subsystems or components) known to an ordinary computer or web programmer skilled in the art. These solution stacks are preferably RESTful, and may include, without limitation, ZEND Server, APACHE Server, NODE.JS, ASP, PHP, Ruby, XAMPP, LAMP, WAMP, MAMP, WISA, LEAP, GLASS, LYME, LYCE, OpenStack, Ganeti, MEAN, MEEN, XRX, and other past, present, or future equivalent solution stacks, or combinations thereof, known to those skilled in the art that allows a programmer to develop the methods and computer programs described within this application. As such, these solution stacks may be deployed in cloud-based platforms by using known development tools such as GitHub, Google Cloud; server hosting services such as Rackspace, Amazon S3, as well as their equivalents. The third party server(s) may comprise any combination of hardware and software (code segments in any number of programmable, executable, or interpretable languages that support the functionality of the methods described herein). The third party server(s) may be configured to communicate directly to the application server via application programming interfaces ("API"), such as those created for communication with the application server, or upon the request of a user.

The network may comprise at least two computers in communication with each other, which may form a data network such as via LAN, WAN, Serial, Z-WAVE, ZIGBEE, RS-485, MODBUS, BACNET, the Internet, or combinations thereof. The connections may be facilitated over various wired and/or wireless mediums or any combination thereof including interconnections by routers and/or gateways. Network may comprise additional hardware components and/or devices appropriate for facilitating the transmission and communication between the various systems and devices of the present invention, such as those directed to integrated authentication, quality control or to improve content delivery such as via a content delivery network (CDN).

Individual components or elements of the system and method may be used interchangeably. The order of the method or processes described above may be arranged in any combination in various embodiments. In some embodiments, various steps may be omitted.

Finally, as the processes described herein can be processor-intensive relative to the available computer hardware, it may be desirable to restrict or monitor user access to the application server, in order to avoid taxing the application server. As such, requests to analyze corpus of certain size may be restricted and/or queued as resources become available to allocate.

One computerized implementation where the principles of the present invention may be employed to particular effect is that of a "chatbot" environment, i.e., a computer program which is capable of carrying out conversation via text (or speech) and which may be capable of responding to and/or carrying out user requests for action. In such an embodiment, the present invention may be optimized to identify action-object pairs, as chatbots are usually employed to handle user requests for action.

A general description of a methodology associated with a chatbot embodiment is as follows. Initially, a set of verbs in the input corpus is identified, which may be accomplished with a point-of-speech tagger. Then, singleton keywords may be identified according to the embodiments described herein.

Next, the terms most related to each candidate intent can be inferred. By way of example, each of the candidate intents defines a support of documents, i.e., the documents in which the terms comprising the candidate intent appear. In each of these documents, there will be terms which are representative of a support and also related to a previously identified verb, if the following criteria is satisfied.

$$p(\text{term, term})\log\left(\frac{0.5p(\text{term, term})}{p(\text{term})^2}\right) < e * p(\text{term, verb})$$

$$\log\left(\frac{p(\text{term, verb})}{p(\text{term})p(\text{verb})}\right)p(\text{term, verb})\log\left(\frac{p(\text{term, verb})}{p(\text{term})p(\text{verb})}\right) > 10^{-5}$$

While the previous step identified terms related to the verbs, there may be other terms that, although not directly related to the verb, are suitable for representation of other aspects of the verb support, i.e. singleton keywords. Accordingly, the same methodology used to identify singleton keywords within the corpus may be implemented with respect to the candidate support in order to discover complimentary terms which define the entire set of action-object candidate pairs.

Next, relationships between the action-object candidate pairs may be determined in order to define classes. Certain intents can be defined by more than one action-object pair. This relationship can be defined by an information gain criterion as follows:

$$IG(OA_1, OA_2) \geq \log(2)*\min(IG(OA_1, OA_1), IG(OA_2, OA_2)).$$

Next, equivalent classes nay be determined and subsumption relationships may be calculated. Larger classes may be formed by aggregating individual action-object pairs, but usually only a subset of action-object pairs are necessary to represent a class. By way of example, candidate pairs may consist of attend_party, attend_event, attend_friend, attend_Friday, but perhaps attend_party is significant enough to subsume all of the candidate pairs and describe the class. According a subsumption relationship may be defined as follows:

$$IS(\text{class,class}) \geq IG(\text{subsumed,subsumed})$$

and $$IG(\text{subsumed,subsumed}) \geq \log(2)*IG(\text{class,subsumed}),$$

in which the classes with the most amount of information gain are deemed to subsume the rest of the classes.

Once action-object candidates are identified, they can be described with reference to the contexts appearing in the sentences related to them. These individual descriptions may then be aggregated and incorporated into a generative model to induce a language model for each one of the intents detected in the corpus, i.e., each of the candidate action-object pairs are modeled by the contexts that best represent them. Accordingly, a new user request (e.g., input text in a chat hot interface) can then be annotated with the action-object pairs which the language model deems to be most similar to the context-based representation of the user request. This may be accomplished via annotating the request with intent(s) that maximize the following probability:

$$\text{argmaxintent}(p(\text{intent}|\text{text})) \propto \prod_{c \in \text{intent}} (\alpha p(c|\text{text}) + (1-\alpha)p(c))^{p(c|\text{intent})}$$

Accordingly, once the primary purpose of the user request is identified via the foregoing analysis, features related to the user request and intent(s) can be identified. As before, features can be selected for annotating the intent(s) which maximize the following probability:

$$\text{argmaxintent}(p(f|\text{intent, text})) \propto$$

$$\prod_{c \in (\text{intent}, f)} (\alpha p(c|\text{text}) + (1-\alpha)p(c))^{p(c|\text{intent}, f)}$$

By maximizing these probabilities, the classifier will annotate text with the feature(s) related to the annotated intent(s) that are most similar to the context-based representation of the user input.

In at least one embodiment, candidate features for each intent may be identified that maximize their probability in the intent along with their probability in the corpus. To this end, the following criteria may be satisfied for a candidate intent: (1) its pointwise mutual information (defined as $$\log \frac{p(\cdot|I)}{p(\cdot)}$$

should have a positive value, while its self-information gain (defined as $$P_I(\cdot \cdot) \cdot \log \frac{P_I(\cdot \cdot)}{P_I(\cdot) \cdot})$$

should be higher than a predetermined value. The inventors have determined that a value of $10^{-5}$ yields satisfactory results in the context of the present invention. The pointwise mutual information criteria generally filters out uninformative candidate features (such as stop words), while the self-information gain tends to filter out overly-specific terms.

Once these relatively uninformative candidate features are filtered out, the most representative features of the candidate features may be determined, and are referred to herein as a core word. According to one embodiment, the candidates may be ranked according to a probability as follows:

$$p(u|I)\log\left(\frac{p(u|I)}{p(u)}\right).$$

In a most preferred embodiment, the candidate features whose probability is larger than approximately $10^{-2}$, can be considered core words.

In certain embodiments, it may be desirable to further filter out those candidate intents which are more strongly related to other intents, as these are considered unsuitable to act as core words. Accordingly, a relatedness threshold may be determined as follows:

$$\log(2)^2 \cdot \log\left(\frac{p(\text{core}-\text{word}|I)}{p(\text{core}-\text{word})}\right).$$

Candidates with pairwise mutual information lower than this threshold may be removed.

In yet further embodiments, it may be desirable to set a specificity threshold to apply to the remaining candidate features. This is because the candidate features may still include words that define specific aspects of an intent, but do not actually define the intent (e.g., for the intent pay-money, words like "loan" or "invoice" may describe specific aspects of the intent, without defining the intent). Additionally, more generic words may describe the content of the intent, but again, do not define the intent. In this regard, the specificity of a word may be defined with respect to its self-pairwise mutual information:

$$\log\left(0.5 \cdot \frac{p_I(w, w')}{p(w)^2}\right).$$

However, the threshold for specificity may not always be predetermined because it depends on the specificity of the class itself. Very specific intents require relatively lower thresholds, because only a few words are needed to describe the intent. Generic intents will require a higher threshold because they require more terms to describe them. However, the core word of the intent may be considered as the most representative descriptor of the intent, and therefore, the specificity of the threshold may, in certain embodiments, be set with reference to the specificity of the core word as a starting point in order to look for other descriptors of the same specificity. Here, very specific intents will only require a small number of terms in close proximity to the core word, while generic intents will require more words. Stated other models of generic intents have a larger entropy, or measure of unpredictability, and therefore require more information to describe the model. With this in mind, the self-pairwise mutual information of the core word can be calculated as follows:

$$sPMI(\text{core}-\text{word}) = \log\left(0.5 \cdot \frac{p_i(\text{core}-\text{word}, \text{core}-\text{word})}{p(\text{core}-\text{word})^2}\right),$$

while the entropy of the intent model is calculated as follows:

$$H - \sum_w \left(p(u|I)\log\left(\frac{p(u|I)}{p(u)}\right)\right) \cdot \log\left(p(u|I)\log\left(\frac{p(u|I)}{p(u)}\right)\right).$$

Given these two quantities, the specificity threshold can be defined as the self-pairwise mutual information of the core word plus the entropy of the intent model. For cases with very low entropy (namely, relatively specific intents) it may be advisable to set a minimum value of the entropy to not less than log(2). Accordingly, the specificity threshold can be expressed as: specificity$_{th}$=sPMI(core-word)+max(log(2), H). Once the set of candidate features is determined, final features (or simply "features") may be determined by arranging the candidate features along a directed acyclic graph according to a predetermined information gain hierarchy. The highest levels of the directed acyclic graph will represent the final features.

Aside from the direct identification of action-object relationships, it may be desirable to implement further rules-based inference of relationship where action-object relationships may not be readily identifiable, e.g., where a user makes use of a new form to request an action of a chat bot. Because the representations of the represent invention are based on distributional contexts, such inference is possible as long as the relationship shares a similar representation. By way of example, given an entity it is possible to understand what actions can be performed, i.e. a user may want to request a reservation but a user will not want to eat a reservation. By way of further example, given an action, it will be possible to understand all entities that can be related to the action, i.e., a reservation may be canceled, but a reservation may not be called. In this regard, a chat bot employing the principles of the present invention can infer information that the user may not have included in the request, e.g., because the user may assume it is speaking with a person and will assume that the other party is capable of such inference.

Additional features of the present invention include clustering of intents through a process to discover intents that share a common concept may be grouped together in a new named category ("cluster") having a label or definition that describes the relationship among the grouped intents.

Yet another aspect of the present invention includes provision of an internet-accessible platform for interaction with software embodiments of the present invention. As such, a user of the present invention may be able to upload, via a client device, a raw input corpus to an application server configured to run a computer program embodiment of the present invention. Once the unsupervised intent induction is completed on the application server, the user may then access a user interface which graphically organizes and displays the intents, features, contexts, clusters, and other elements disclosed herein. The platform provides the user with the ability to review and explore the relationships between the foregoing elements and create custom classifiers that are relevant to the user's interests.

Yet another aspect of the present invention includes the ability to conduct intent extraction on publicly available datasets that compliment a user's dataset. By way of example, assume a user uploads a corpus of social media posts pertaining to tweets about smartphones. This corpus may be combined with, e.g., various Wikipedia articles about smartphones in order to expand and improve the intent induction.

BRIEF DESCRIPTION OF THE DRAWINGS

For a fuller understanding of the nature of the present invention, reference should be had to the following detailed description taken in connection with the accompanying drawings in which:

FIG. 2A is a schematic flow chart depicting the steps of a method according to one embodiment of the present invention.

DETAILED DESCRIPTION OF THE PREFERRED EMBODIMENT

Figure 1:
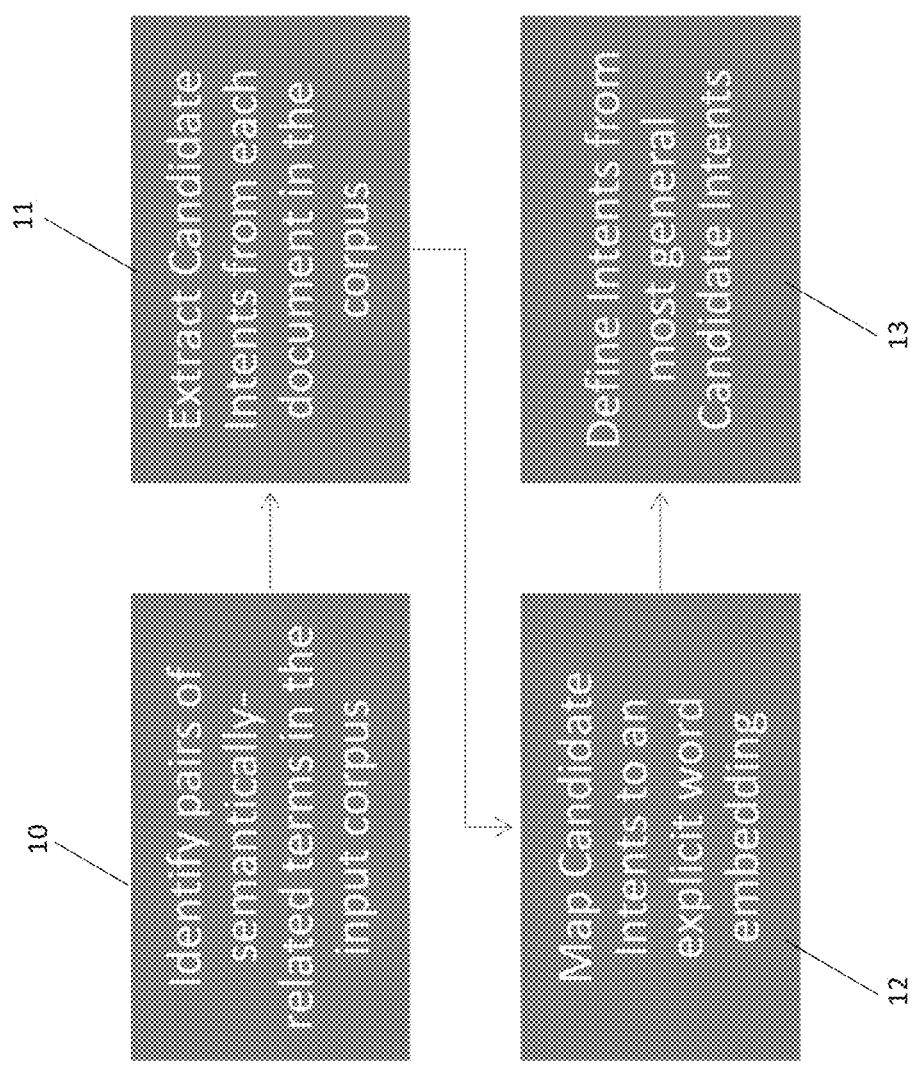
FIG. 1 is a schematic flow chart depicting the steps of a method according to one embodiment of the present invention.
Figure 1A:
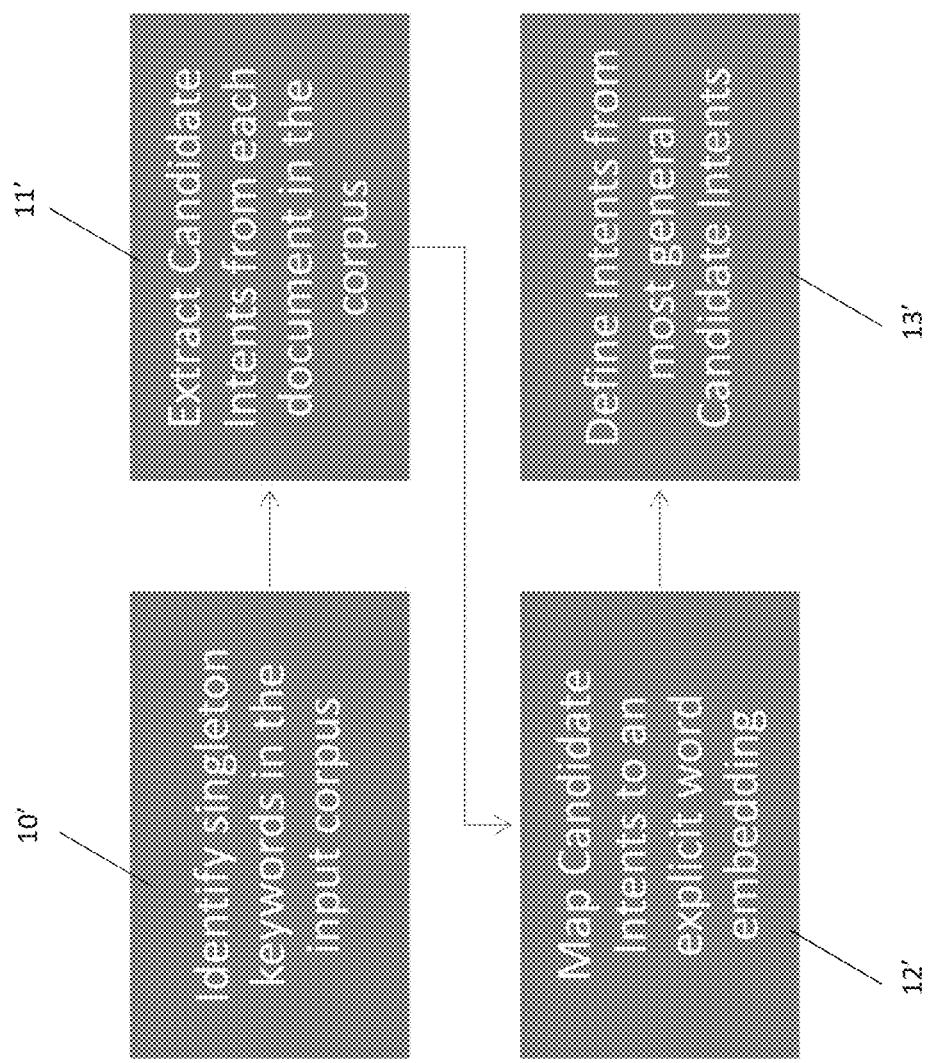

With reference to FIGS. 1 and 1A, two embodiments of the methodology of the present invention are depicted in flow charts. As may be appreciated, the methodologies depicted in FIGS. 1 and 1A are intended to generalize the methodology in broad and simple steps in order to facilitate disclosure of the present invention, but that the inventive methodology may contain additional procedures (or sub-procedures) in order to carry out its complex functionality. As such, any of the depicted steps can be modified or combined with other steps as disclosed herein. The initial step, identifying pairs of semantically-related terms in the input corpus 10 may include accessing a corpus of documents that include text, with a system of the present invention, the system being operative to analyze the corpus and identify semantic relationships between pairs or groups of words. Next, candidate intents may be identified from the semantically-related terms, as at 11, if such terms (i) co-occur in a single document of the corpus; and (ii) all of the elements are pairwise included in the set of semantically-related terms. With respect to FIG. 1A, the initial step of identifying singleton keywords 10' can be accomplished as disclosed herein.

Figures 3, 4:
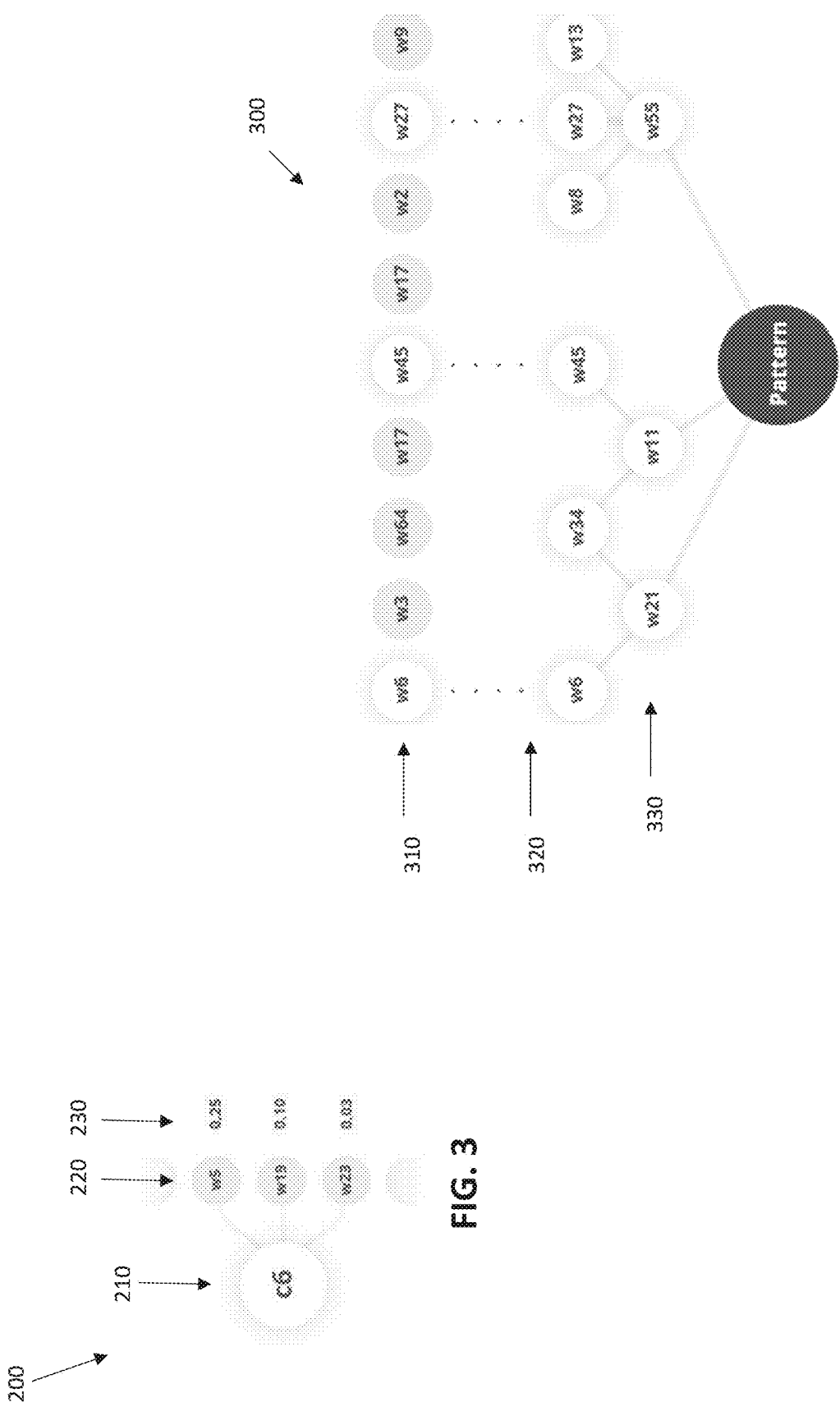
FIG. 3 is a diagrammatic depiction of a directed acyclic graph employed in one embodiment of the present invention.
FIG. 4 is a diagrammatic depiction of a directed acyclic graph employed in one embodiment of the present invention.

A diagrammatic depiction of a directed acyclic graph is included in FIG. 3, wherein a candidate intent 2W may include a group of words 220 associated therewith. The group of words 220 will generally be semantically-related and have associated therewith a relationship metric 230, such as, but not limited to, a value associated with an Information Gain Criterion. In certain embodiments, this semantic relationship may be referred to as a word edge represented by E={{xi, yi}}. As discussed herein, certain embodiments of the present invention undertake the step of identifying candidate intents by computing document signatures (referred to herein as "S") from the edges E, where each signature is a group of words obtained by projecting the edges E onto the set of all semantically-related terms identified from the corpus.

Returning to FIG. 1, the next steps of the depicted embodiment are to map candidate intents to an explicit word embedding and defining the intents from the most general candidate intents. As can be seen in FIG. 4, a diagrammatic depiction of a directed acyclic graph ("DAG") 300 is represented as one embodiment of such an explicit word embedding. As can be seen, candidate intents 310 are organized within the DAG 300, with vertices of increasing generality 320 leading to the final, most general intents 330.

This process of discovering the most general intents 330 is performed by analyzing the candidate intents 310 for divergence and entropy, wherein candidate intents 310 which are artifacts or statistically insignificant remain in the least general portions of the DAG 300.

In certain embodiments, the foregoing steps may be accomplished by organization of document signatures S within the aforementioned DAG 300 and utilizing Kullback-Leibler divergence as well as perplexity (as a measure of entropy in language) to arrange each signature in order of increasing generality along the DAG 300. By way of example, if there is an arc of $S_1 \rightarrow S_2$, within the DAG 300, then $S_2$ may be considered a generalization for $S_1$ (depicted in FIG. 4 as the vertices of increasing generality 320). Finally, in a preferred embodiment, the intents 330 are defined by referencing a one-to-one correspondence with the set of document signatures S such that no further arcs are available for such signature, i.e., there are no further vertices of increasing generality 320.

Figure 2:
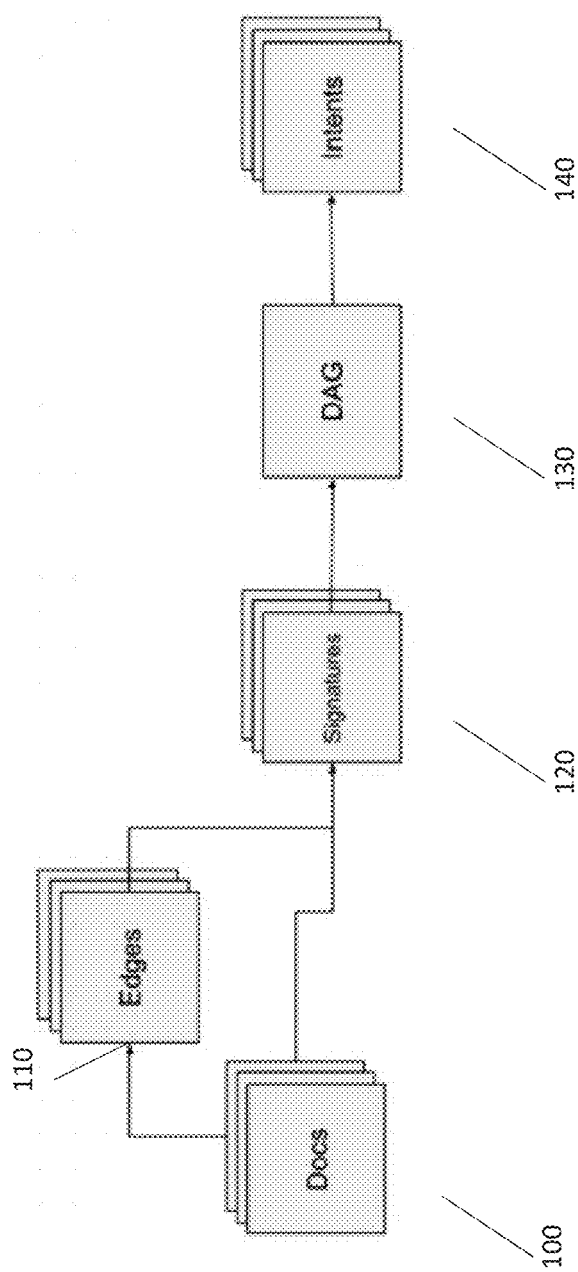
FIG. 2 is a schematic flow chart depicting the steps of a method according to one embodiment of the present invention.

With reference to FIG. 2, a schematic diagram of the inventive methodology of the present invention is depicted. The input corpus 100 is initially evaluated relative to producing edges 110, which may be sets or groups of words that are semantically related. By way of non-limiting example, an input corpus 100 of social media posts pertaining to negative airline experiences yielded exemplary edges 110 of {customer, interaction}, {bag, carry}, {annual, disobedience}, {never, fly} among a multitude of others. In certain embodiments, an information gain criterion may be utilized to discard or ignore edges that do not satisfy a predetermined metric.

Signatures 120 may then be identified for each document in the corpus 100 from the edges 110, where each signature 120 is a clique of words obtained by projecting the edges 100 onto the set of all pairs of terms from the documents in the corpus 100, even if such pairs of terms did not qualify as an edge 110. By way of non-limiting example, signatures 120 extracted from the above-referenced corpus 100 of social media posts pertaining to negative airline experiences yielded exemplary signatures 120 of {annual, worker, disobedience}, {inoperable, pillow, blanket}, and {bag, carry}, among a multitude of others. All signatures 120 are then arranged in an organizational matrix such as a directed acyclic graph ("DAG") 130. As such, the most general signatures 120 may be computed and therefore, the final intents 140 are found. By way of non-limiting example, arranging the foregoing exemplary signatures 120 in a DAG yielded {customer, service} as a more general signature 120 than {customer, interaction} and (bag, check) as a more general signature 120 than {economy, basic, onboard}. Additionally, non-limiting examples of final intents 140 developed from the foregoing example included {seat, inoperable}, {bag, check}, and {customer, service}.

While the system of the present invention is intended to be carried out on a computer system, and, as such, the edges no, signatures 120, and intents 140 are likely to be stored, called, and/or written in or to a memory of the computer system as bits or bytes of data, the present invention is operative to label or otherwise identify each edge 110, signature 120, or intent 140 with a representative word group, pair, or group, such that an operator or user of the present invention may easily understand and interpret each edge 110, signature 120, or intent 140.

Figure 5:
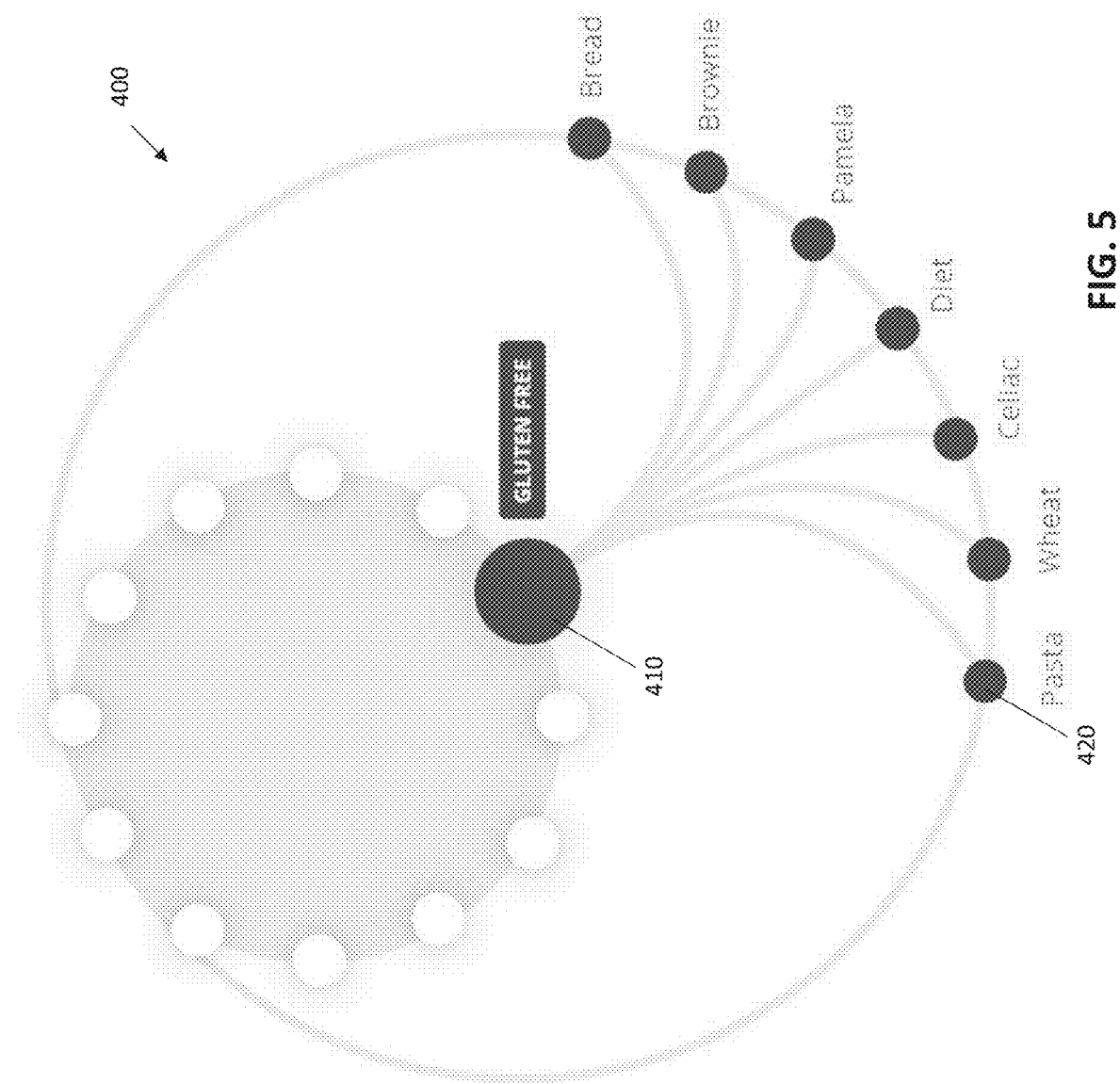
FIG. 5 is a depiction of a user interface of a system according to one embodiment of the present invention.

FIG. 5 is a depiction of a user interface 400 in accordance with a software program of one embodiment of the present invention. Therein, and once the inventive methodology has completed defining intents from a corpus, a plurality of intents are depicted in an organized fashion via intent icons 410 which facilitate user interaction with same. Upon interacting with an intent icon 410, the system may be operative to display a plurality of raw documents and/or texts representative of the intent for which the intent icon 410 pertains. In yet further embodiments, and as depicted, the intent icon 410 may be operative to further display a plurality of associated feature icons 420. As discussed herein, a feature may be considered as a specification of an intent. As exemplified by the depicted embodiment, the selected intent icon 410 represents the intent "gluten-free" which was defined from a corpus of grocery reviews. The available feature icons 420 pertain to further specificity of the selected intent icon 410. Interaction with an available feature icon 420 may be operative to present a user with only the documents in the corpus that pertain to the selected feature icon 420.

Since many modifications, variations and changes in detail can be made to the described preferred embodiment of the invention, it is intended that all matters in the foregoing description and shown in the accompanying drawings be interpreted as illustrative and not in a limiting sense.

What is claimed is:

1. A method for facilitating unsupervised language understanding comprising:
    utilizing a computer system to identify semantically significant terms in a corpus of documents, the semantically significant terms comprising semantically related groups of terms within the corpus of documents;
    utilizing an information gain criterion to identify the semantically related groups, the semantically related terms satisfying a predetermined condition of the information gain criterion;
    extracting candidate intents from the semantically significant terms;
    mapping each of the candidate intents to a directed acyclic graph and organizing each of the candidate intents according to a predetermined hierarchy of generalization;
    defining a set of intents from the most general of the candidate intents; and
    configuring the computer system to generate a user interface including a plurality of icons representative of the intents and candidate intents, wherein the icons are arranged according to the predetermined hierarchy of generalization, and wherein the user interface is operative to further display at least one document within the corpus which is representative of the intent when a user interacts with the at least one icon.

2. The method as recited in claim 1 wherein the step of extracting candidate intents is accomplished via identifying semantically related groups wherein each term of the semantically related groups occurs in the same document of the corpus and all terms of the semantically related group are included in the previously identified semantically significant terms.

3. The method as recited in claim 1 wherein the predetermined hierarchy of generalization is determined by computing document signatures, where each document signature is a group of words obtained by projecting word edges onto the set of all semantically significant terms identified from the corpus.

4. The method as recited in claim 3 wherein each document signature is arranged in order of increasing generality along the directed acyclic graph.

5. The method as recited in claim 4 wherein intents are defined according to the most general of the candidate intents as determined by the hierarchy of generalization.

6. The method as recited in claim 1 further comprising annotating at least some of the defined intents with at least one feature associated with at least one of the defined intents, wherein the at least one feature provides additional semantic information related to a specific context of the intent.

7. The method as recited in claim 1 wherein the semantically significant terms comprise singleton keywords.

8. The method as recited in claim 7 wherein the singleton keywords are identified according to a predetermined self-contained information scoring criterion.

9. The method as recited in claim 8 wherein the predetermined self-contained information scoring criterion is defined as the logarithmic ratio of a measure of entropy of a given singleton keyword to a calculated information gain score of the given singleton keyword.

10. The method as recited in claim 9 wherein candidate intents are extracted from the set of all identified singleton keywords that have a self-contained information scoring criterion value above a first predetermined threshold and below a second predetermined threshold.

11. The method as recited in claim 10 further specifying a set of features for each candidate intent, the set of features providing additional semantic information related to at least one specific context of the candidate intent.

12. The method as recited in claim 11 wherein defining an intent comprises selecting from the extracted candidate intents those candidate intents with features appearing in at least one quarter of the documents in the corpus of documents that include the candidate intent.

13. A method for facilitating unsupervised language understanding of a user input request to inform an automated response, the method comprising:
    utilizing a computer system to identify at least one action-object candidate in a request input by a user;
    the step of identifying at least one action-object candidate further comprising configuring the computer system to:
    identify an initial set of verbs within the request;
    identify an initial set of singleton keywords within the request;
    for each verb within the initial set of verbs, identify at least one object within the input corpus which may be related to each verb according to a predetermined criterion;
    establish semantically related groups from each of the at least one object determined to be related to each of the verbs within the initial set of verbs;
    utilize an information gain criterion to compare the similarity of each of the semantically related groups in order to determine a plurality of classes describing each of the semantically related groups;
    utilize a subsumption relationship criterion to determine whether at least some of the plurality of classes are subsumed by others in the plurality of classes;
    and
    define the at least one action-object candidate with respect to those classes within the plurality of classes which are not subsumed by any of the others in the plurality of classes
    further configuring the computer system to: an input corpus of text;
    identify at least one intent related to the request;

identify at least one feature related to the at least one intent, the step of identifying at least one feature related to the at least one intent further comprising:
assessing a pointwise mutual information and a self-information gain of a plurality of candidate features; arranging the plurality of candidate features along a directed acyclic graph according to an information gain hierarchy wherein candidate features with higher self-information gain are arranged higher in the information gain hierarchy; selecting the at least one feature from a highest level of the directed acyclic graph;
annotate each of the at least one intent with each of the at least one feature;
annotate each of the at least one action-object candidate with the at least one intent;
wherein the at least one action-object candidate annotated with the at least one intent at least partially determines a response to the user which is generated by the computer system.

14. The method as recited in claim 13 wherein the step of identifying at least one feature related to the at least one intent comprises assessing a pointwise mutual information and a self-information gain of a candidate feature, and selecting as features those candidate features which have both a positive pointwise mutual information and a self-information gain higher than a predetermined threshold value.

* * * * *